(12) United States Patent
Jin

(10) Patent No.: US 6,295,825 B1
(45) Date of Patent: Oct. 2, 2001

(54) COMBINED DRYING AND REFRIGERATING STOREHOUSE

(76) Inventor: Keum Su Jin, Room 401 Jupung Village, 316-8, Kil-Dong, Kangdong-Ku, Seoul (KR)

( * ) Notice: Subject to any disclaimer, the term of this patent is extended or adjusted under 35 U.S.C. 154(b) by 0 days.

(21) Appl. No.: 09/634,173

(22) Filed: Aug. 9, 2000

(30) Foreign Application Priority Data

Sep. 18, 1999 (KR) .................................................. 99-40314

(51) Int. Cl.⁷ .............................. F26B 19/00; F26B 27/00
(52) U.S. Cl. .......................... 62/238.7; 34/66; 62/324.1; 165/133
(58) Field of Search .................... 34/66, 71; 62/94, 62/238.7, 324.1, 324.3

(56) References Cited

U.S. PATENT DOCUMENTS 3,965,696 * 6/1976 Thomason ............................. 62/160
4,016,657 * 4/1977 Arjon Dev Passey ............. 62/513 X
4,811,493 * 3/1989 Burgio ................................. 34/66 X

FOREIGN PATENT DOCUMENTS 50-160 22 2/1975 (JP) .
100226679 11/1999 (KR) .

* cited by examiner

Primary Examiner—William Wayner
(74) Attorney, Agent, or Firm—Hedman & Costigan, P.C.

(57) ABSTRACT

A combined drying and refrigerating storehouse is disclosed. The storehouse comprises a housing, circulation passages, a heat pump unit, a second evaporator, flow passage control means and a control unit. The housing has a heat pump unit chamber and two combined drying and refrigerating chambers. The heat pump unit chamber is divided from the combined drying and refrigerating chambers by two partition walls. The circulating chambers are extended outwardly from the partition walls and extended vertically. The heat pump unit has a compressor, a four-way valve, first and second heat exchangers and a second condenser. The compressor, the fourway valve, the first heat exchanger, the second condenser, the second heat exchanger and the compressor are connected one after another by means of a first conduit. The outlet of the four-way valve is connected to the inlet of the compressor by means of a suction conduit. The second evaporator is disposed on a portion of a second conduit. The second conduit connects the second condenser to the output-side portion of the first conduit with regard to the second heat exchanger functioning as an evaporator. The flow passage control means is disposed on the first and second conduits. The control unit controls the four-way valve, the flow passage control means, etc.

4 Claims, 3 Drawing Sheets

COMBINED DRYING AND REFRIGERATING STOREHOUSE

BACKGROUND OF THE INVENTION

1. Field of the Invention

The present invention relates, in general, to a combined drying and refrigerating storehouse and, more particularly, to a combined drying and refrigerating storehouse using a heat pump unit.

2. Description of the Prior Art

As well known to those skilled in the art, a drying technique has been generally utilized to easily store and transport agricultural, marine or livestock products, and a refrigeration or freezing technique has been generally utilized to maintain the freshness of the agricultural, marine or livestock products.

In general, the agricultural, marine or livestock products are stored in the refrigerating storehouse after the products are dried. Accordingly, the products are transported to and stored in the refrigerating storehouse after the products are dried, so that the treatment and transportation costs of the products become expensive.

Japanese Patent Publication No. Sho 50-16022 discloses a combined drying and refrigerating storehouse for reducing the treatment and transportation costs. In this combined drying apparatus and refrigerating storehouse, the unitized principal parts of the drying and refrigerating apparatus are mounted on one side of a dry and refrigerating chamber, and the unit is fabricated by disposing an air-cooled condenser and a water-cooled condenser in parallel between a compressor and an evaporator. For a drying operation, high temperature and high pressure coolant gas is condensed in the water-cooled condenser, and indoor air is dehumidified and cooled by the evaporator, heated by the water-cooled condenser and circulated through the drying and refrigerating chamber by its blower, thereby allowing articles to be dried. On the other hand, for a refrigerating operation, the temperature of the drying and refrigerating chamber is lowered by the water-cooled condenser and the evaporator after the drying of the articles is completed, thereby allowing articles to be refrigerated.

However, in this conventional combined drying apparatus and refrigerating storehouse, since the water-cooled condenser is formed separately to condense coolant gas, the compressed coolant liquid is dehumidified and cooled in the evaporator and, thereafter, the dehumidified and cooled coolant is heated in the air-cooled condenser, its construction is complicated and the time period for drying articles in the storehouse is lengthened owing to difficulty in increasing the temperature of drying air.

In order to overcome the problems, the inventor of the present invention proposed a combined drying apparatus and refrigerating storehouse in Korean Patent No. 226679. In this combined drying apparatus and refrigerating storehouse, a exhaustion chamber, a circulation passage and a drying and refrigerating chamber are formed one after another in a housing, an outdoor heat exchanger and an indoor heat exchanger are respectively mounted on the sidewall of the exhaustion chamber and under the partition plate of the drying and refrigerating chamber, thus forming a closed circulation pass that is positioned between the circulation passage and the drying and refrigerating chamber and passes through the heat exchangers, dampers are mounted on the partition plate of the exhaustion chamber, and ambient air preheating means communicating with the exhaustion chamber is disposed on the upper portion of the housing, thereby performing drying and refrigerating operations effectively, This combined drying apparatus and refrigerating storehouse has advantages in which drying air is circulated and a dehumidifying operation is performed easily, drying efficiency is increased by the promotion of the gasification of coolant liquid, and the dried articles can be refrigerated without being removed. However, this combined drying apparatus and refrigerating storehouse has shortcomings in which a first group of articles must be removed to another refrigerating chamber when a second group of articles are desired to be dried while the first group of articles are refrigerated in the storehouse and a third group of articles must be completely dried and removed to another place when a fourth group of articles are desired to be refrigerated while the third group of articles are dried in the storehouse because drying and refrigerating operations can be performed selectively, thereby increasing the treatment time period and treatment cost for the articles.

SUMMARY OF THE INVENTION

Accordingly, the present invention has been made keeping in mind the above problems occurring in the prior art, and an object of the present invention is to provide a combined drying apparatus and refrigerating storehouse, which is capable of rapidly drying and refrigerating agricultural, marine or livestock products at the same time and easily performing the ventilation of its drying chamber and the defrosting of its refrigerating chamber.

In order to accomplish the above object, the present invention provides a combined drying and refrigerating storehouse, comprising: a housing having a heat pump unit chamber at its central portion and two combined drying and refrigerating chambers at its side portions, the heat pump unit chamber being divided from the combined drying and refrigerating chambers by two partition walls; two circulating chambers extended outwardly from the partition walls and extended vertically, the circulating chambers respectively communicating with the upper and lower portions of the combined drying and refrigerating chambers and having blowers at their lower portions; a heat pump unit having a compressor, a four-way valve, first and second heat exchangers and a second condenser, the compressor, the four-way valve, the first heat exchanger, the second condenser, the second heat exchanger and the compressor being connected one after another by means of a first conduit, the outlet of the four-way valve being connected to the inlet of the compressor by means of a suction conduit, the compressor, the four-way valve and the second condenser being disposed in the heat pump unit chamber and the first and second heat exchangers being disposed in upper portions of the circulation chambers; a second evaporator disposed on a portion of a second conduit, the second conduit connecting the second condenser to a point on the output-side portion of the first conduit with regard to the second heat exchanger functioning as an evaporator; means for controlling a flow passage of coolant, the flow passage control means being disposed on the first and second conduits; and a control unit for controlling the four-way valve, the flow passage control means, etc.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
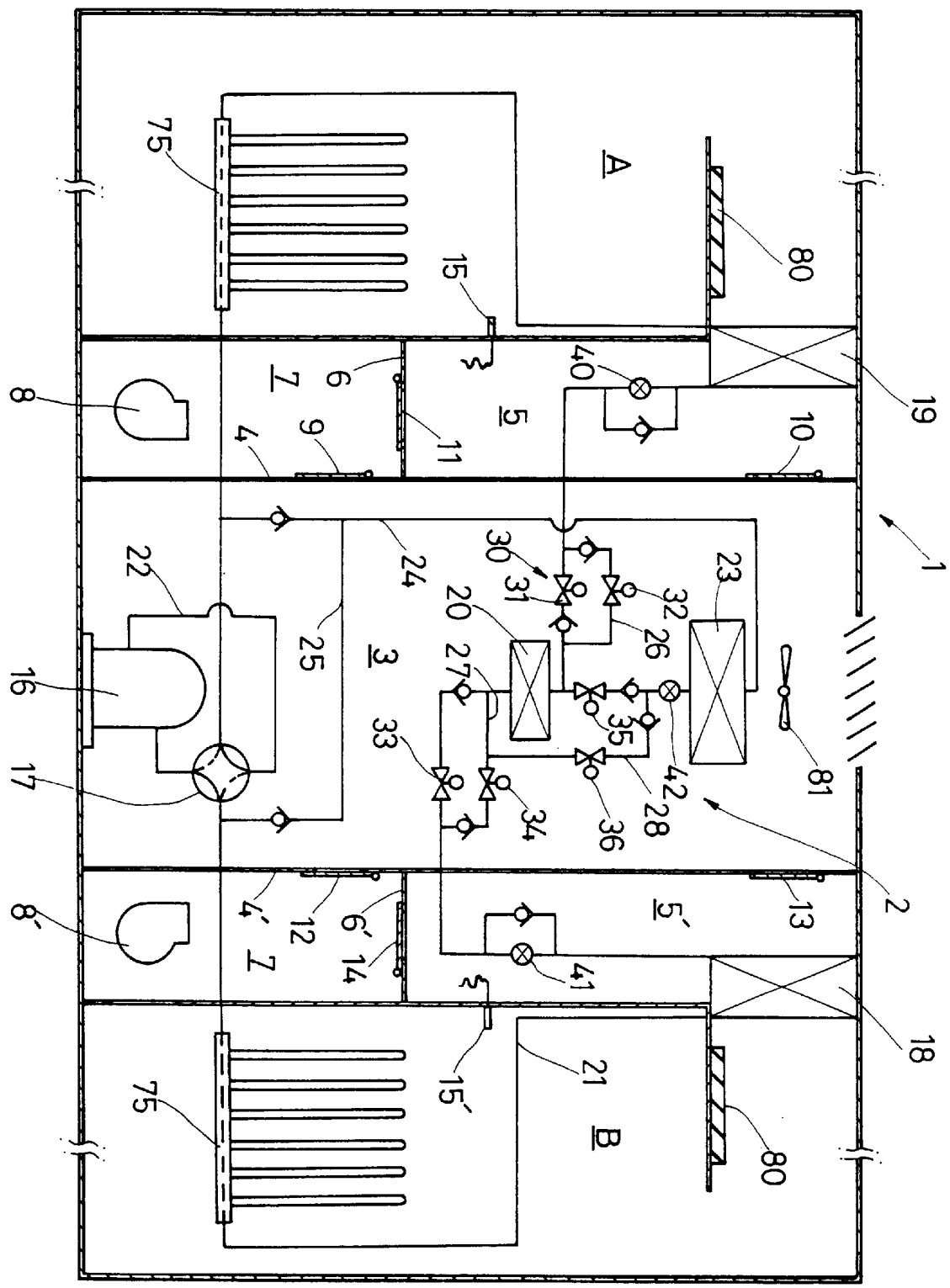
FIG. 1 is a cross section showing a combined drying and refrigerating storehouse in accordance with a preferred embodiment of the present invention.

As illustrated in FIG. 1, a combined drying and refrigerating storehouse according to the present invention comprises a housing 1 and a heat pump unit 2 that is mounted in the housing 1.

In the housing 1, a heat pump unit chamber 3 opened to the atmosphere is formed on the central portion of the interior of the housing 1, two combined drying and refrigerating chambers A and B (will be referred to as "chamber A" and "chamber B") are respectively formed on the side portions of the interior of the housing 1, and two circulation passages 5 and 5' respectively communicating with the upper and lower portions of the chambers A and B are respectively formed between the heat pump unit chamber 3 and the chamber A and between the heat pump unit chamber 3 and the chamber B. The heat pump unit chamber 3 is divided from the two circulation passages 5 and 5' by means of partition walls 4 and 4'.

The circulation passages 5 and 5' are respectively divided into upper passages and lower passages 7 and 7' by partition plates 6 and 6'. Two blowers 8 and 8' are respectively mounted in the lower passages 7 and 7'. Two dampers 9 and 10 are respectively mounted on the upper and lower portion of the partition wall 4, two dampers 12 and 13 are respectively mounted on the upper and lower portions of the partition wall 4', and two dampers 11 and 14 are respectively mounted on the partition plates 6 and 6'. Two temperature sensors 15 and 15' are respectively disposed in the chambers A and B.

In the heat pump unit, a compressor 16, a four-way valve 17 and a second condenser 20 are disposed in the heat pump unit chamber 3, and a first heat exchanger 18 and a second heat exchanger 19 are respectively disposed in the upper portions of the circulation passages 5 and 5'. The compressor 16, the four-way valve 17, the first and second heat exchangers 18 and 19 and the compressor 16 are connected one after another by means of a first conduit 21, and the outlet of the four-way valve 17 is connected to the inlet of the compressor 16 by means of a suction conduit 22. Accordingly, the first heat exchanger 18 functions as a condenser and the second heat exchanger 19 functions as an evaporator when the chamber A functions as a refrigerating chamber and the chamber B functions as a drying chamber, whereas the functions of the first and second heat exchangers 18 and 19 are changed when the functions of the chambers A and B are changed. In order to evaporate coolant liquid while the coolant liquid condensed in the second condenser 20 is bypassed to the compressor 16 without passing through the first and second heat exchangers 18 and 19, a point on the output-side portion of the first conduit 21 with regard to the second heat exchanger 19 functioning as an evaporator is connected to the second condenser 20 by a second conduit 24, a second evaporator 23 is disposed on the portion of the second conduit 24 passing through the heat pump unit chamber 3, and a point on the input-side portion of the first conduit 21 with regard to the first heat exchanger 18 functioning as a condenser is connected to a point on the second conduit 24 by a third conduit 25. When the first heat exchanger 18 functions as a condenser, low temperature and low pressure coolant gas evaporated in the second evaporator 23 passes through the second conduit 24 and enters the compressor 16 through the four-way valve 17 and the suction conduit 22; whereas when the second heat exchanger 19 functions as an condenser, low temperature and low pressure coolant gas evaporated in the second evaporator 23 passes through the third conduit 25 and enters the compressor 16 through the four-way valve 17 and the suction conduit 22.

Flow passage control means comprised of solenoid valves for changing the flow passage of coolant is disposed on the first and second conduits 21 and 24. That is, a first solenoid valve 31 is disposed on the portion of the first conduit 21 between the second heat exchanger 19 and the second condenser 20, a second solenoid valve 32 is disposed on a first bypass 26 around the first solenoid valve 31, a third solenoid valve 33 is disposed on the portion of the first conduit 21 between the first heat exchanger 18 and the second condenser 20, a fourth solenoid valve 34 is disposed on a second bypass 27 around the third solenoid valve 33, a fifth solenoid valve 35 is disposed on the portion of the second conduit 24 between the second condenser 20 and the second evaporator 23, and a sixth solenoid valve 36 on a third bypass 28 connecting the second bypass 27 with the input-side portion of the second conduit 24 with regard to the second evaporator 23. A first expansion valve 19 is disposed on the input-side portion of the first conduit 21 with regard to the second heat exchanger 19 functioning as an evaporator, a second expansion valve 20 is disposed on the input-side portion of the first conduit 21 with regard to the first heat exchanger 18 functioning as a evaporator, and a third expansion valve 42 is disposed on the input-side portion of the second conduit 24 with regard to the second evaporator 23.

Figure 3:
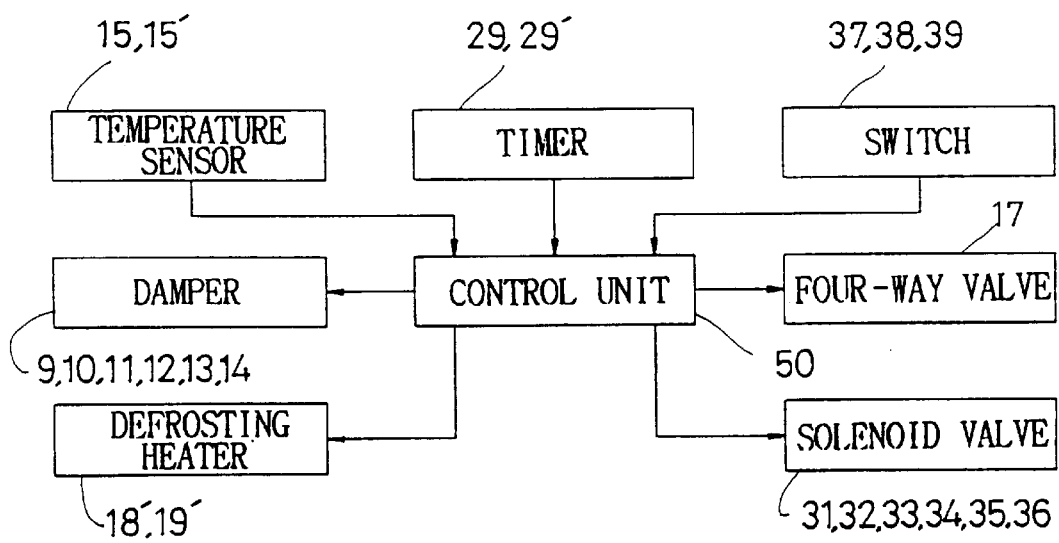
FIG. 3 is a block diagram showing a control-related construction for the combined drying and refrigerating storehouse.

As depicted in FIG. 3, the combined drying and refrigerating storehouse of the present invention comprises a control unit 50. The control unit 50 selectively operates the four-way valve 17, the defrosting heaters 18' and 19', the six solenoid valves 31 to 36, and the dampers 9 to 14, in response to an output signal of the temperature sensors 15 and 15', the timers 29 and 29', and the switches 37, 38 and 39.

Figure 4:
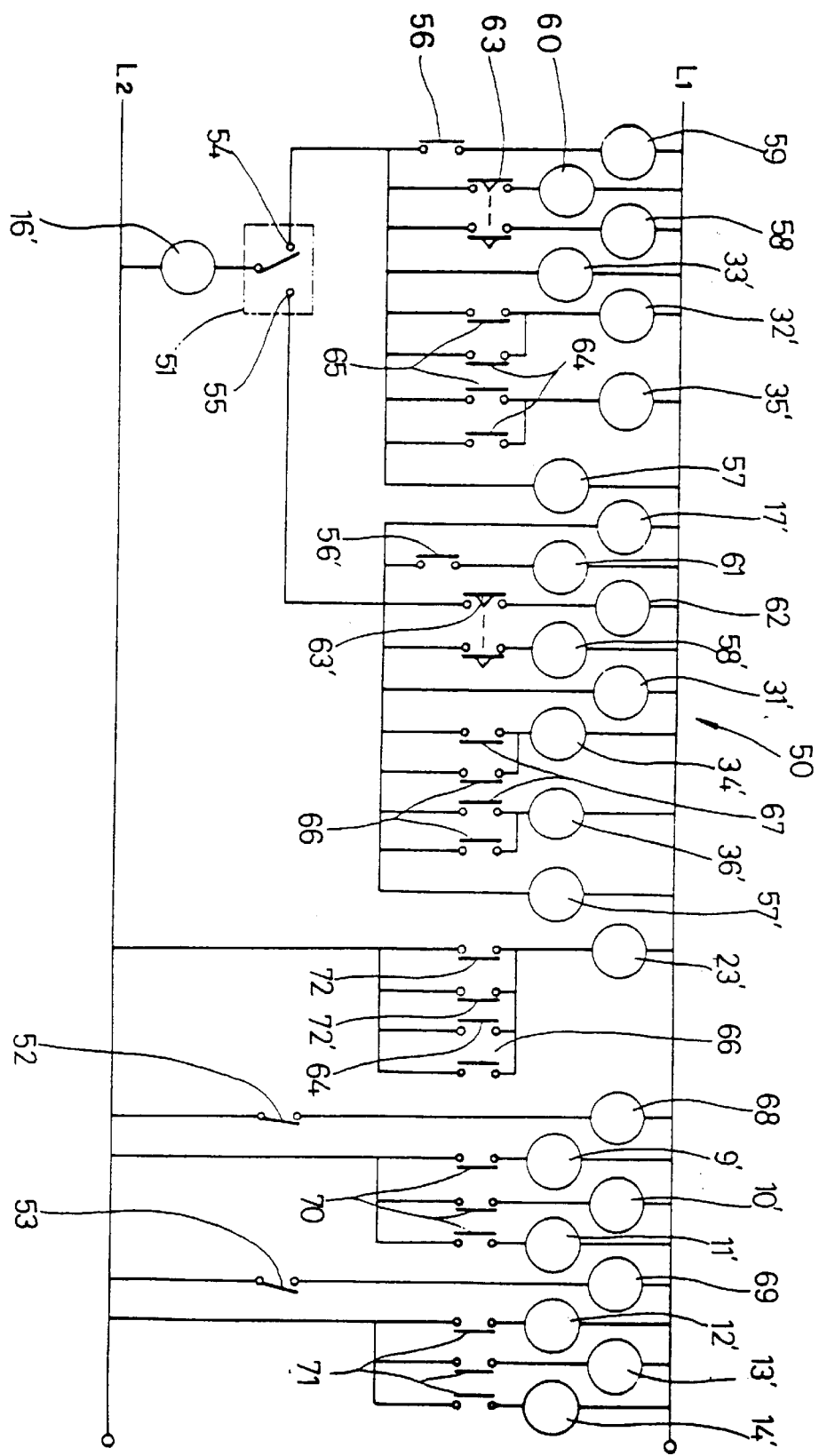
FIG. 4 is a diagram showing a control unit for the combined drying and refrigerating storehouse.

As illustrated in FIG. 4, the control unit 50 comprises a compressor relay 16' connected in series to a switch relay 51 having first and second contacts 54 and 55. A four-way valve relay 17' is connected to the second contact 55 so that the flow passage of coolant can be changed when the second contact 55 becomes ON.

A temperature sensor relay 56, a timer relay 57, a defrosting heater relay 58 and solenoid valve relays 32', 33' and 35' are connected in parallel to the first contact 54 of the switch relay 51 via auxiliary relays 59 and 60, a timer relay contact 63 and auxiliary relays 64 and 65. A temperature sensor relay 56', a timer relay 57', a defrosting heater relay 58' and solenoid valve relays 31', 34' and 36' are connected in parallel to the second contact 55 of the switch relay 51 via auxiliary relays 61 and 62, a timer relay contact 63' and auxiliary relays 66 and 67. A second relay evaporator relay 23' that is operated in response to a relay signal of the temperature sensor relays 56 and 56 ' or timer relays 57 and 57' is connected in parallel to a compressor relay 16', first and second damper relays 68 and 69 are respectively connected to first and second switch relays 52 and 53 connected in parallel to the compressor relay 16', and simultaneously the contacts 70 of the first damper relay contact 68 are respectively connected to damper auxiliary relays 9', 10' and 11' and the contacts 71 of the second damper relay contact 69 are respectively connected to damper auxiliary relays 12', 13' and 14'.

The damper auxiliary relays 9' to 14 40 may be classified into one group of first, second and third damper auxiliary relays 9', 10' and 11' connected to the first damper relay contact 70 in series and another group of fourth, fifth and sixth damper auxiliary relays 12', 13' and 14 40 connected to the second damper relay contact 71 in series. The first and second switch relays 52 and 53 used to operate the damper auxiliary relays 9' to 12 40 may be replaced with timer relays or humidity sensor relays.

The housing 1 may preferably be fabricated in the form of a portable container for the convenience of movement. For example, in the case of a 40-foot housing, the chamber B is integrated with the heat pump unit chamber 3 into a single body, the chamber A is formed larger than the chamber B, they are moved to a place where a combined drying and refrigerating storehouse is installed, and, thereafter, the combined drying and refrigerating storehouse is completed by connecting their conduits to one another. In this case, the relatively large chamber A is preferably used as a refrigerating chamber.

Figure 2:
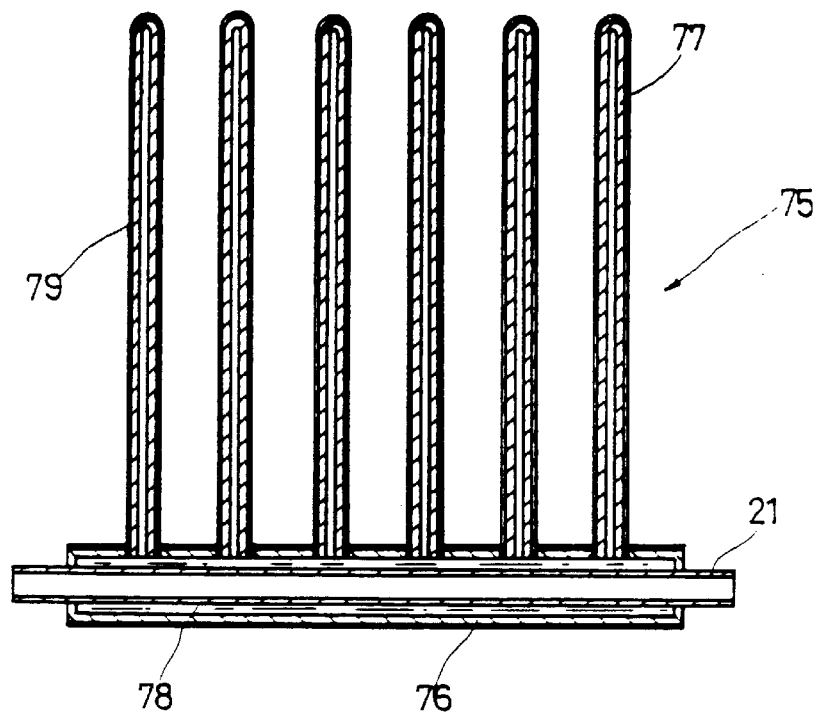
FIG. 2 is a cross section showing a state where a heat piping is mounted.

As depicted in FIG. 1, two groups of heat piping 75 are respectively disposed on the portions of the first conduit 21 passing through the chambers A and B. As illustrated in FIG. 2, the heat piping 75 comprises an evaporating portion 76 surrounding the first conduit 21, a plurality of condensing portions 77 vertically mounted to communicate with the evaporating portion 76, and working fluid 78, such as distilled water, alcohol, liquid ammonia or the like, filling the interiors of the evaporating portion 76 and the condensing portions 77. In the heat piping 75, there is reiterated a cycle in which the working fluid 78 is evaporated in the evaporating portion 76 by means of the heat possessed by the coolant flowing through the first conduit 21, the evaporated working fluid 78 ascends to the evaporating portion 77 and is condensed in the evaporating portion 77, and, thereafter, the condensed working fluid 78 descends back to the evaporating portion 76. Additionally, a far-infrared ray radiating film 79 is formed on the exterior surface of the heat piping 75, so that the heat piping 75 radiates far-infrared rays to articles desired to be dried and refrigerated.

Dehumidifying agents 80 made of diatomaceous earth, zeolite, silica, alumina or the like are positioned on the upper portions of the chambers A and B.

Reference numeral 81 designates an exhaustion fan.

In the combined drying and refrigerating storehouse of the present invention, before a drying operation and a refrigerating operation are performed at the same time in the chambers A and B, the blowers 8 and 8' and the compressor 16 are operated by the manipulation of a switch (not shown) and the abnormal pressure in the compressor 16 is examined. When abnormality does not exist, the operations are initiated by manipulating the switch 37. At this time, the third damper 11 and the sixth damper 14 are kept open. Hereinafter, the operations of the combined drying and refrigerating storehouse are described.

1. Refrigerating Operation in Chamber A and Drying Operation in Chamber B

As the first contact 54 of the switch relay 51 is rendered to be ON by the manipulation of the switch 37, the third solenoid valve relay 33' becomes ON to open the third solenoid valve 33, the four-way valve relay 17' becomes OFF to maintain the four-way valve 17 in a state where the four-way valve 17 allows the coolant to flow toward the chamber A through the chamber B, the fifth solenoid valve relay 35' becomes OFF by means of the first auxiliary relay 59 and the first auxiliary relay contact 64 to close the fifth solenoid valve 35, and the second solenoid valve relay 32' becomes ON by means of the first auxiliary relay contact 64 to open the second solenoid valve 32.

Preparation for the operations is performed in such a way that the temperature sensor relay 56 is rendered to be ON as the temperature sensor 15 begins to take temperatures, and the timer 29 disposed in the chamber A sets a defrosting time period for the second heat exchanger 19 by means of the timer relay 57. At this time, the set value of the temperature sensor 15 is different depending upon the kinds of articles stored in the chamber A.

As the first contact 54 is rendered to be ON by the manipulation of the switch 37, there is reiterated a cycle in which coolant is compressed into high temperature and high pressure coolant gas in the compressor 16, passes through the four-way valve 17 and the heat piping 75 of the chamber B and performs the drying operation in the chamber B by means of condensation heat while being condensed in the first heat exchanger 18 functioning as a condenser, the condensed coolant liquid passes through the third solenoid valve 33 and is completely condensed by means of the reduction of temperature while being secondly condensed in the second condenser 20, the completely condensed coolant liquid passes through the second solenoid valve 32, is expanded in the first expansion valve 40 and performs the refrigerating operation in the chamber A by means of its evaporation heat while being evaporated in the second heat exchanger 19, and the evaporated coolant gas of low temperature and low pressure passes through the heat piping 75 of the chamber A and enters the compressor 16 through the four-way valve 17 and the suction conduit 22.

The third and sixth dampers 11 and 14 are kept open and the blowers 8 and 8' are operated while the refrigerating and drying operations are respectively performed in the chambers A and B, so that air in the chambers A and B are circulated through the circulation passages 5 and 5', thus allowing the drying and refrigerating operations to be well performed.

While the drying and refrigerating operations are performed, the working fluid 78 is evaporated in the evaporating portion 76 by means of the heat possessed by the coolant flowing through the first conduit 21, the evaporated working fluid 78 ascends to the evaporating portion 77 and is condensed in the evaporating portion 77, and, thereafter, the condensed working fluid 78 descends back to the evaporating portion 76. When the working fluid 78 is condensed in the evaporating portion 77, the working fluid 78 radiates condensation heat and simultaneously far-infrared rays are radiated from a far-infrared ray radiating film 79 formed on the exterior surface of the heat piping 75. Since the far-infrared rays are radiated to the articles desired to be dried or radiated, the articles desired to be dried are dried uniformly and sufficiently and the articles desired to be refrigerated are kept fresh.

In the meantime, a portion of circulated air is automatically dehumidified by the dehumidifying agent 80.

As the switch relay 53 is rendered to be ON by the manipulation of the switch 39, the sixth damper 14 is closed by means of the second damper relay contact 71 and the sixth damper auxiliary relay 14', and the fourth damper 12 and the fifth damper 13 are respectively opened by means of the fourth damper auxiliary relay 12 40 and the fifth damper auxiliary relay 13'. Accordingly, the chamber B is ventilated, so that the circulation air is dehumidified, thus shortening the time period for the drying operation.

2. Refrigerating and Defrosting Operations in Chamber A

When the temperature of the chamber A falls on or below the set value while the refrigerating operation is performed in the chamber A and the drying operation is performed in the chamber B as described above, the temperature sensor 15 renders the temperature sensor relay 56 to be OFF, thereby closing the second solenoid valve 32 through the second solenoid valve relay 32' by means of the first auxiliary relay 59 and the first auxiliary relay contact 64, and opening the fifth solenoid valve 35 through the fifth solenoid valve relay 35' by the first auxiliary relay contact 64 and simultaneously allowing the second evaporator 23 to be operated by means of the second evaporator relay 23'. On the one hand, coolant liquid flowing out of the second condenser 20 does not flow into the second heat exchanger 19 and accordingly the operation of the second heat exchanger 19 is stopped, so that the refrigeration temperature of the chamber A is adjusted. On the other hand, the coolant liquid flowing out of the second condenser 20 passes through the fifth solenoid valve 35 of the second conduit 24 and is expanded in the third expansion valve 42, the expanded coolant liquid is evaporated into low temperature and low pressure coolant gas in the second evaporator 23, and the low temperature and low pressure coolant gas passes through the second conduit 24 and the first conduit 21 and enters the compressor 16 through the four-way valve 17 and the suction conduit 22. The air of the heat pump unit chamber 3 cooled by the second evaporator 23 is exhausted out of the housing 1 by means of the exhaustion fan 81. If the chamber B is ventilated by the opening of the fourth and fifth dampers 12 and 13 while the air in the heat pump unit chamber 3 is exhausted to the outside as described above, the waste heat in the chamber B is supplied to the second evaporator 23, and so the evaporation of coolant liquid is performed well in the second evaporator 23. Accordingly, superior drying capacity can be maintained when the temperature of the ambient air is low, and thermal efficiency can be improved by the utilization of the waste heat.

When the temperature of the chamber A rises above the set value from the above-described state, the temperature sensor 15 renders the temperature sensor relay 56 to be ON, thereby closing the fifth solenoid valve 35 through the fifth solenoid valve relay 35' by means of the first auxiliary relay 59 and the first auxiliary relay contact 64, and opening the second solenoid valve 32 through the second solenoid valve relay 32' by the first auxiliary relay contact 64 and simultaneously stopping the second evaporator 23 from being operated by means of the second evaporator relay 23'. Accordingly, the operation of the second heat exchanger 19 is restored, and so the refrigeration operation in the chamber A is continued.

Meanwhile, when the set time period of the timer 29, which is operated as soon as the temperature sensor 15 begins to take a temperature, terminates, the timer 29 opens the fifth solenoid valve 35 through the fifth solenoid valve relay 35' using the second auxiliary relay 60 and the second relay contact 65 through the timer relay 57 and the timer relay contact 63, closes the second solenoid valve 32 through the second solenoid valve relay 32' by means of the second auxiliary relay contact 65, and allows the second evaporator 23 to be operated by means of the defrosting heater contact 72 and the second evaporator relay 23' and simultaneously operates the defrosting heater 19' disposed under the second heat exchanger 19 by means of the timer relay contact 63 and the defrosting heater relay 58 (the operation of second heat exchanger 19 is automatically stopped).

While the second heat exchanger 19 is defrosted by the defrosting heater 19', coolant liquid flowing out of the second condenser 20 is expanded in the third expansion valve 42 and evaporated into low temperature and low pressure coolant gas in the second evaporator 23, and the evaporated coolant gas passes through the second conduit 24 and the first conduit 21 and enters the compressor 16 through the four-way valve 17 and the suction conduit 22.

When the defrosting operation has been performed for the set defrosting time period, the timer 29 stops the defrosting heater 19' by means of the timer relay 57 and the timer relay contact 63, closes the fifth solenoid valve 35 through the fifth solenoid valve relay 35' using the second auxiliary relay 60 and the second auxiliary relay contact 65 through the timer relay contact 63, opens the second solenoid valve 32 through the second solenoid valve relay 32' by means of the second auxiliary relay contact 65, and stops the second evaporator 23 from being operated by means of the defrosting heater contact 72 and the second evaporator relay 23'. Additionally, as soon as the second evaporator 23 is stopped from being operated, the second heat exchanger 19 is automatically operated, so that the refrigerating operation in the chamber A is continued.

3. Refrigerating Operation in Chamber B and Drying Operation in Chamber A

As the second contact 55 of the switch relay 51 is rendered to be ON by the manipulation of the switch 37, the first solenoid valve relay 31' becomes ON to open the first solenoid valve 31, the four-way valve relay 17' becomes ON to manipulate the four-way valve 17 to a state where the four-way valve 17 allows the coolant to flow toward the chamber B through the chamber A, the fourth solenoid valve relay 34' becomes ON by means of the third auxiliary relay 61 and the third auxiliary relay contact 66 to open the fourth solenoid valve 34, and the sixth solenoid valve relay 36' becomes OFF by means of the third auxiliary relay contact 66 to close the sixth solenoid valve 36. Meanwhile, preparation for the operations is performed in such a way that the temperature sensor relay 56 ' is rendered to be ON as the temperature sensor 15' begins to take temperatures, and the timer 29' disposed in the chamber B sets a defrosting time period for the first heat exchanger 18 by means of the timer relay 57'. At this time, the set value of the temperature sensor 15' is different depending upon the kinds of articles stored in the chamber B.

As the second contact 55 is rendered to be ON by the manipulation of the switch 37, there is reiterated a cycle in which coolant is compressed into high temperature and high pressure coolant gas in the compressor 16, passes through the four-way valve 17 and the heat piping 75 of the chamber A and performs the drying operation in the chamber A by means of condensation heat while being condensed in the second heat exchanger 19 functioning as a condenser, the condensed coolant liquid passes through the first solenoid valve 31 and is completely condensed by means of the reduction of temperature while being secondly condensed in the second condenser 20, the completely condensed coolant liquid passes through the fourth solenoid valve 34, is expanded in the second expansion valve 41 and performs the refrigerating operation in the chamber B by means of its evaporation heat while being evaporated in the first heat exchanger 18, and the evaporated coolant gas of low temperature and low pressure passes through the heat piping 75 of the chamber B and enters the compressor 16 through the four-way valve 17 and the suction conduit 22.

The third and sixth dampers 11 and 14 are kept open and the blowers 8 and 8' are operated while the drying and refrigerating operations are respectively performed in the chambers A and B, so that air in the chambers A and B are circulated through the circulation passages 5 and 5', thus allowing the drying and refrigerating operations to be well performed.

While the drying and refrigerating operations are respectively performed in the chambers A and B, the heat piping 75 and the dehumidifying agent 80 perform the same function as that of the case where the refrigerating and drying operations are respectively performed in the chambers A and B.

As the switch relay 52 is rendered to be ON by the manipulation of the switch 38, the third damper 11 is closed by means of the first damper relay contact 70 and the third damper auxiliary relay 11', and the first damper 9 and the second damper 10 are respectively opened by means of the first damper auxiliary relay 9' and the second damper auxiliary relay 10'. Accordingly, the chamber A is ventilated, so that the circulation air is dehumidified, thus shortening the time period for the drying operation.

4. Refrigeration and Defrosting Operations in Chamber B

When the temperature of the chamber B falls on or below the set value while the drying operation is performed in the chamber A and the refrigerating operation is performed in the chamber B as described above, the temperature sensor 15' renders the temperature sensor relay 56 ' to be OFF, thereby closing the fourth solenoid valve 34 through the fourth solenoid valve relay 34' by means of the third auxiliary relay 61 and the third auxiliary relay contact 66, and opening the sixth solenoid valve 36 through the sixth solenoid valve relay 36' by the third auxiliary relay contact 66 and simultaneously allowing the second evaporator 23 to be operated by means of the second evaporator relay 23'. On the one hand, coolant liquid flowing out of the second condenser 20 does not flow into the first heat exchanger 18 and accordingly the operation of the third heat exchanger 18 is stopped, so that the refrigeration temperature of the chamber B is adjusted. On the other hand, the coolant liquid compressed in the second condenser 20 passes through the sixth solenoid valve 36 of the third bypass 28 and is expanded in the third expansion valve 42, the expanded coolant liquid is evaporated into low temperature and low pressure coolant gas in the second evaporator 23, and the low temperature and low pressure coolant gas passes through the second conduit 24, the third conduit 25 and the first conduit 21 and enters the compressor 16 through the four-way valve 17 and the suction conduit 22. The air of the heat pump unit chamber 3 cooled by the second evaporator 23 is exhausted out of the housing 1 by means of the exhaustion fan 81. If the chamber A is ventilated while the air in the heat pump unit chamber 3 is exhausted to the outside as described above, superior drying capacity can be maintained and thermal efficiency can be improved the same as that of the case where the refrigerating and defrosting operations are performed in the chamber A.

When the temperature of the chamber A rises above the set value from the above-described state, the temperature sensor 15' renders the temperature sensor relay 56 ' to be ON, thereby closing the sixth solenoid valve 36 through the sixth solenoid valve relay 36' by means of the third auxiliary relay 61 and the third auxiliary relay contact 66, and opening the fourth solenoid valve 34 through the fourth solenoid valve relay 34' by the third auxiliary relay contact 66 and simultaneously stopping the second evaporator 23 from being operated by means of the second evaporator relay 23'. Accordingly, the operation of the first heat exchanger 18 is restored, and so the refrigeration operation in the chamber B is continued.

Meanwhile, when the set time period of the timer 29', which is operated as soon as the temperature sensor 15' begins to take a temperature, terminates, the timer 29' opens the sixth solenoid valve 36' through the sixth solenoid valve relay 36' using the fourth auxiliary relay 62 and the fourth relay contact 67 through the timer relay 57' and the timer relay contact 63', closes the fourth solenoid valve 34 through the fourth solenoid valve relay 34' by means of the sixth auxiliary relay contact 67, and allows the second evaporator 23 to be operated by means of the defrosting heater contact 72' and simultaneously operates the defrosting heater 18' disposed under the first heat exchanger 18 by means of the timer relay contact 63' and the defrosting heater relay 58' (the operation of first heat exchanger 19 is automatically stopped).

While the first heat exchanger 18 is defrosted by the defrosting heater 18' as described above, coolant liquid flowing out of the second condenser 20 is expanded in the third expansion valve 42 and evaporated into low temperature and low pressure coolant gas in the second evaporator 23, and the evaporated coolant gas passes through the second conduit 24, the third conduit 25 and the first conduit 21 and enters the compressor 16 through the four-way valve 17 and the suction conduit 22.

When the defrosting operation has been performed for the set defrosting time period, the timer 29' stops the defrosting heater 18' by means of the timer relay 57' and the timer relay contact 63', closes the sixth solenoid valve 36 through the sixth solenoid valve relay 36' using the fourth auxiliary relay 62 and the fourth auxiliary relay contact 67 through the timer relay contact 63', opens the fourth solenoid valve 34 through the fourth solenoid valve relay 34' by means of the fourth auxiliary relay contact 67, and stops the second evaporator 23 from being operated by means of the defrosting heater contact 72' and the second evaporator relay 23'. Additionally, as soon as the second evaporator 23 is stopped from being operated, the first heat exchanger 18 is automatically operated, so that the refrigerating operation in the chamber B is continued.

Although the drying and refrigerating operations are described to be performed in the above-described embodiment, the drying and freezing operations may be performed in the combined drying and refrigerating storehouse of the present invention by the simple alteration of the capacity in its design.

In accordance with the present invention, since first and second portions of agricultural, marine or livestock products can be respectively dried and refrigerated at the same time and the second and first portions can be respectively dried and refrigerated at the same place, the treatment time period for the products can be shortened and the treatment cost for the products can be reduced.

Additionally, since dampers are mounted to the partition wall and the sidewall of the circulation passages, the circulation and ventilation of air can be performed, thereby shortening the drying time period for the products. The defrosting of the refrigerating chamber can be easily performed while the drying operation is performed. Since two groups of the heat piping are mounted on the portions of the first conduit passing through the combined drying and refrigerating chambers and the far-infrared films are formed on the heat piping, far-infrared rays can be radiated to the products desired to be dried or refrigerated, thereby improving drying efficiency for the products desired to be dried and keeping the products desired to be refrigerated fresh. Since dehumidifying agents are disposed on the upper portions of the combined drying and refrigerating chambers, circulated air can be dehumidified well.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A combined drying and refrigerating storehouse, comprising:

a housing having a heat pump unit chamber at its central portion and two combined drying and refrigerating chambers at its side portions, the heat pump unit chamber being divided from the combined drying and refrigerating chambers by two partition walls;

two circulating chambers extended outwardly from the partition walls and extended vertically, said circulating chambers respectively communicating with upper and lower portions of the combined drying and refrigerating chambers and having blowers at their lower portions;

a heat pump unit having a compressor, a four-way valve, first and second heat exchangers and a second condenser, the compressor, the four-way valve, the first heat exchanger, the second condenser, the second heat exchanger and the compressor being connected one after another by means of a first conduit, an outlet of said four-way valve being connected to an inlet of the compressor by means of a suction conduit, the compressor, the four-way valve and the second condenser being disposed in the heat pump unit chamber and the first and second heat exchangers being disposed in upper portions of the circulation chambers;

a second evaporator disposed on a portion of a second conduit, said second conduit connecting the second condenser to a point on an output-side portion of the first conduit with regard to the second heat exchanger functioning as an evaporator;

means for controlling a flow passage of coolant, said flow passage control means being disposed on the first and second conduits; and a control unit for controlling said four-way valve, said flow passage control means, etc.

2. The storehouse according to claim 1, wherein an interior of each of said circulation passages is divided into two portions by means of a partition plate, a plurality of dampers are mounted on each of said partition walls and said partition plate, and the dampers are controlled by said control unit.

3. The storehouse according to claim 1, wherein groups of heat piping are mounted on portions of said first conduit passing through said combined drying and refrigerating chambers, and far-infrared ray radiating films are formed on the heat piping.

4. The storehouse according to claim 1, wherein dehumidifying agents are disposed on upper portions of said combined drying and refrigerating chambers.

* * * * *